(12) United States Patent
Bampton et al.

(10) Patent No.: US 7,435,306 B2
(45) Date of Patent: *Oct. 14, 2008

(54) METHOD FOR PREPARING RIVETS FROM CRYOMILLED ALUMINUM ALLOYS AND RIVETS PRODUCED THEREBY

(75) Inventors: Clifford C. Bampton, Thousand Oaks, CA (US); John R. Wooten, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/348,841

(22) Filed: Jan. 22, 2003

(65) Prior Publication Data

US 2004/0140019 A1    Jul. 22, 2004

(51) Int. Cl.
*B22F 5/00* (2006.01)
*C22C 21/00* (2006.01)

(52) U.S. Cl. .................. 148/440; 419/38; 419/66; 148/437

(58) Field of Classification Search .................. 419/32, 419/33, 30, 61, 38, 66; 148/437, 440
See application file for complete search history.

(56) References Cited

U.S. PATENT DOCUMENTS

| | | | |
|---|---|---|---|
| 3,172,546 A | 3/1965 | Schreiner | |
| 3,740,210 A | 6/1973 | Bomford et al. | |
| 3,771,480 A | 11/1973 | Johnson | |
| 3,771,729 A | 11/1973 | Frable | |
| 3,791,800 A | 2/1974 | McGee | |
| 3,960,607 A | 6/1976 | Manzonelli et al. | |
| 4,069,042 A | 1/1978 | Buchovecky et al. | |

(Continued)

FOREIGN PATENT DOCUMENTS

WO    WO 00/27559 A    5/2000

OTHER PUBLICATIONS

Metal Suppliers Online @ http://www.suppliersonline.com/propertypages/7050.asp#Spec.*

(Continued)

*Primary Examiner*—John P. Sheehan
*Assistant Examiner*—Jessee R. Roe
(74) *Attorney, Agent, or Firm*—Alston & Bird LLP (57) ABSTRACT

High strength aluminum alloy rivets are provided in which the aluminum alloys exhibit high strength at atmospheric temperatures and maintain high strength and ductility at extremely low temperatures. The rivets are produced from an alloy which is made by blending about 89 atomic % to 99 atomic % aluminum, 1 atomic % to 11 atomic % of a secondary metal selected from the group consisting of magnesium, lithium, silicon, titanium, zirconium, and combinations thereof, and up to about 10 atomic % of a tertiary metal selected from the group consisting of Be, Ca, Sr, Ba, Ra, Sc, V, Cr, Mn, Fe, Co, Ni, Cu, Zn, Y, Nb, Mo, Tc, Ru, Rh, Pd, Ag, Cd, W, and combinations thereof. The alloy is produced by nanostructure material synthesis, such as cryomilling, in the absence of extrinsically added refractory dispersoids. The synthesized alloy is then consolidated and formed into a solid or blind rivet. Grain size within the rivet is less than 0.5 μm, and the rivet has exceptional thermal stability, resistance to strain localization cracking during rivet head upsetting, and resistance to stress corrosion cracking during service.

11 Claims, 3 Drawing Sheets

U.S. PATENT DOCUMENTS

| | | | |
|---|---|---|---|
| 4,090,874 | A | 5/1978 | Kaufman |
| 4,113,472 | A | 9/1978 | Fister, Jr. et al. |
| 4,129,443 | A | 12/1978 | Kaufman |
| 4,239,159 | A | 12/1980 | Johns |
| 4,620,886 | A | 11/1986 | Wincierz et al. |
| 4,627,959 | A * | 12/1986 | Gilman et al. .............. 419/61 |
| 4,647,304 | A | 3/1987 | Petkovic-Luton et al. |
| 4,722,751 | A | 2/1988 | Akechi et al. |
| 4,772,342 | A | 9/1988 | Polmear |
| 4,818,481 | A | 4/1989 | Luton et al. |
| 4,853,179 | A | 8/1989 | Shiina |
| 4,909,867 | A | 3/1990 | Masumoto et al. |
| 4,992,242 | A | 2/1991 | Faure |
| 4,996,014 | A * | 2/1991 | Suvanto ..................... 264/113 |
| 5,053,084 | A | 10/1991 | Masumoto et al. |
| 5,565,169 | A | 10/1996 | Webster |
| 5,580,666 | A * | 12/1996 | Dubensky et al. ........... 428/552 |
| 5,728,479 | A | 3/1998 | Childree et al. |
| 5,775,603 | A | 7/1998 | Kohler et al. |
| 5,902,943 | A | 5/1999 | Schaffer et al. |
| 6,027,582 | A | 2/2000 | Shahani et al. |
| 6,171,038 | B1 | 1/2001 | Pratt et al. |
| 6,248,188 | B1 | 6/2001 | Smolej et al. |
| 6,267,684 | B1 | 7/2001 | Luhm |
| 6,315,842 | B1 | 11/2001 | Shahani et al. |
| 6,402,860 | B2 | 6/2002 | Hashikura et al. |
| 6,468,468 | B1 | 10/2002 | Neubing et al. |
| 6,544,357 | B1 * | 4/2003 | Hehmann et al. ........... 148/420 |

OTHER PUBLICATIONS

Liao, X.Z. et al., Deformation mechanisms at different grain sizes in a cryogenically ball—milled Al—Mg alloy, Ultrafine Grained Materials II (2002), 323-330, Photomicrographs, Diffraction Patterns, 16 Ref. Minerals, Metals and Materials Society/Aime, Warrendale, PA; Conference: Ultrafine Grained Materials II.

Aikin, B..J.M. et al, Improvements in cryomill processing. Advanced Particulate Materials & Processes 1997, 287-294, Graphs, 6 Ref. Metal Powder Industries Federation, Princeton, NJ; Conference: 5th International Conference on Advanced Particulate Materials & Proce.

Lee, Z. et al., Microstructural evolution of cryomilled nanocrystalline Al-Ti-Cu alloy, Ultrafine Grained Materials II (2002), 653-659, Diffraction Patters, Photomicrographs, Graphs, 10 Ref. Minerals, Metals and Materials Society/Aime, Warrendale, PA; Conference: Ultrafine Grained Materials II.

Choi, J.H. et al., Consolidation behavior of nanocrystalline Al -5at. %Ti alloys synthesized by cryogenic milling, Journal of Alloys and Compounds (Feb. 9, 2001) 315, (1-2), 178-186, Diffraction Patterns, Photomicrographs, Graphs, 22 Ref. ISSN: 0925-8388.

Han, B.Q. et al., High-temperature mechanical behavior of a nanostructured Al- 7.5%Mg-0.3%Sc alloy, First and Second International Symposia On Superplasticity and Superplastic forming Technology: Proceedings From material Solutions 2001 and 2002 (2003), 33-38, Graphs, Photomicrographs, 19 Ref. ASM Itnernational. Member/customer Service Center, MAT.

Zhou F. et al, Thermally Stable Nanocrystalline AL-MG Alloy Powders Produced by Cryomilling, Materials Science Forum vols. 386-388 (2002) pp. 409-414, 2002 Trans Tech Publications, Switzerland.

International Search Report for PCT/US2004/000701.

Written Opinion for PCT/US2004/000701.

* cited by examiner

METHOD FOR PREPARING RIVETS FROM CRYOMILLED ALUMINUM ALLOYS AND RIVETS PRODUCED THEREBY

FIELD OF THE INVENTION

The present invention relates to high strength aluminum alloy rivets, and to the production of high strength aluminum alloy rivets made with cryomilled aluminum.

BACKGROUND OF THE INVENTION

Rivets are often used in the aerospace industry to securely fasten the metal or composite components of aerospace vehicles to one another. In the interest of weight conservation and strength requirements, the rivets are often constructed of high strength aluminum, titanium, or alloys thereof.

To fasten two metal components with a rivet, holes are first defined in the respective components and the holes are aligned with one another. Once aligned, a rivet is placed through the hole. The rivet comprises a head portion, which has a larger diameter than the hole and therefore does not enter the hole, and a body portion, which extends through the hole and projects from the opposing side of the joined components. To lock the rivet in place, a force is applied to the region of the rivet body that is opposite the head and projecting past the joined components, while the head is held in place. This force deforms the body and provides a structural junction between the two components. The act of deforming the rivet is known as upsetting.

After installation, the rivet is expected to keep the metal components joined together over the life of the aerospace vehicle. Due to the nature of aircraft and other aerospace vehicles, the rivets may be exposed to great physical stresses. In addition, the rivets must endure various environments, wet and dry, hot and cold, depending upon the exposure of the vehicle to various conditions. As a result of these stresses and environmental conditions, rivets sometimes crack or otherwise fail.

Experience indicates that grain size of the material from which the rivet is constructed is a primary consideration in increasing rivet longevity and decreasing rivet failure rates. Rivets of material having fine grain sizes have been shown to be less prone to cracking upon upsetting and are also less prone to long-term stress corrosion cracking.

Precipitation hardening heat treatment is currently the only method to produce high strength aluminum alloy rivets having fine grain sizes. Rivets made from precipitation heat treated aluminum alloys remain adequate for most modern day applications but fall short of today's high-performance needs.

There are problems related to precipitation heat treatment microstructures, including cracking during rivet head upsetting due to a deformation mechanism known as strain localization caused by strain softening on shear planes as the coherent hardening precipitates become sheared by deformation dislocations. Another problem with precipitation heat treatment microstructures is cracking during service due to residual stresses from the water quench and rivet upsetting and to the well known susceptibility of these precipitation hardened microstructures to stress corrosion cracking. Further, precipitation heat treatment introduces residual stress and distortion in the metal, which may lead to eventual failure of the rivet.

What are needed are improved aluminum alloy rivets that do not depend upon precipitation heat treating techniques and that are capable of withstanding the extreme temperatures, corrosive environments, and extreme mechanical stresses inherent in high-performance aerospace vehicles. To achieve these goals, it is desired to produce an aluminum alloy rivet having fine grain size, extremely fine and thermally stable (non-heat treatable) dispersoid particles, and a matrix alloy composition which resists strain localization.

SUMMARY OF THE INVENTION

A high strength aluminum alloy rivet and method of making the rivet is provided by the invention, which provides for the production of unique aluminum alloy powders that may be extruded, forged, or otherwise formed into rivets having extremely high strength and extended longevity. The rivets exhibit high strength and ductility at extremely low temperatures and maintain thermal stability within a wide temperature range.

The material for construction of the rivet is based upon aluminum alloys having a very fine and stable grain structure. The fine grain structure, small grain size, and other physical properties inherent to the alloy result in rivets extruded or forged from the alloy that have high strength and that maintain high strength and ductility even at very low temperatures. Aluminum alloys such as those used in the production of the invented rivets are further discussed in U.S. patent application Ser. No. 10/263,135, filed Oct. 2, 2002, incorporated herein by reference.

The alloy is produced as a powder by blending aluminum and a secondary metal selected from magnesium, lithium, silicon, titanium, and zirconium, and synthesizing nanostructured materials from the powder, preferably by cryomilling. The secondary metal is either alloyed with the aluminum prior to cryomilling or the magnesium and aluminum are supplied as a blend and alloyed during the cryogenic milling. In either situation, it is preferred that extrinsic refractory material such as oxides, nitrides, carbides, and borides, are not added to the alloy prior to or during cryomilling.

It is preferred that high work hardening compositions, such as aluminum-magnesium, be used as alloys for the invented rivets. High work hardening matrix alloy compositions contribute to avoidance of strain localization.

The alloy is about 89 atomic % to about 99 atomic % aluminum, and about 1 atomic % to about 11 atomic % of the secondary metal. Optionally, the alloy contains up to 10 atomic % of another metal (in addition to the aluminum and the secondary metal) selected from Be, Ca, Sr, Ba, Ra, Sc, V, Cr, Mn, Fe, Co, Ni, Cu, Zn, Y, Nb, Mo, Tc, Ru, Rh, Pd, Ag, Cd, W, or combinations thereof.

Although copper and zinc may be used as tertiary metals in the practice of this invention, it is preferred that neither copper nor zinc be used in the alloy. Although copper and zinc are typical in conventional high strength aluminum alloys, both copper and zinc lower corrosion resistance of aluminum alloys and promote stress corrosion cracking.

Cryomilling the aluminum and secondary metal provides a resultant powder having a very stable grain structure. The average grain size within the alloy is less than 0.5 μm, and alloys with average grain size less than 0.1 μm may be produced. The small, stable grains of the alloy allow rivets to be extruded or forged from the alloy which exhibit significantly improved strength over similar alloys produced by other methods. Rivets constructed from the cryomilled aluminum alloys also exhibit dramatically improved strength at low temperatures.

The alloy production does not rely on the supplemental addition of oxides, nitrides, or similar refractory substances, as do traditional methods of cryomilling metals. The alloy gains its strength from the unique composition of the material and the unique processing techniques used in the milling of the alloy. Refractory materials are preferably present within the alloy in amounts less than about 0.5 volume %. More preferably, refractory materials are present in amounts of less than about 0.2%.

The aluminum and secondary metal are alloyed together and cryomilled as a solid solution and, to a small degree, as a precipitate. Since liquid nitrogen is used as the cooling solution for cryomilling, small amounts of nitrogen may be introduced into the alloy as a result of the exposure of the aluminum metal to nitrogen during the cryomilling. It has been found that this nitrogen does not form refractory-type nitrides to any appreciable degree. Once again, the alloy relies on unique grain properties gained during processing, rather than the oxide/nitride dispersion strengthening used in previous high strength cryomilled aluminum alloys.

After cryomilling of the alloy powder, the powder is maintained in a substantially oxygen free atmosphere. Storage and handling in an argon or a dry nitrogen atmosphere are the preferred means for maintaining the oxygen free atmosphere. The oxygen is kept from the milled alloy so that the surface of the metal particles will not oxidize prior to being extruded. The argon or nitrogen atmosphere also prevents the metal powder from absorbing moisture before further processing can take place. The cryomilling results in an alloy with average grain size of less than 0.5 μm, and preferably less than 0.1 μm.

The milled metal powder is degassed and consolidated to form a solid metal that is substantially free of porosity. Degassing may be accomplished through canning, or other methods known in the art. Consolidation of the metal may be accomplished with a hot isostatic press (HIP), or other methods known in the art. After the metal powder is compressed, the consolidated metal alloy is extruded at a temperature, extrusion ratio area, and ram speed appropriate for the particular alloy.

After extrusion, the metal is forged or otherwise shaped into the shape of a rivet. The rivet may be of any shape known in the art. For instance, the rivet may be a simple solid rivet consisting of a head portion and a cylindrical body portion, or the rivet may be a more complex blind rivet consisting of a head portion and a sleeve or shank portion having an axially aligned bore extending through the sleeve.

Although not wishing to be bound by theory, the extraordinary strength and the ability of the rivet to maintain high strength at extremely low temperatures are believed to be due to the unique grain structure, grain size, and interaction of constituents of the alloy caused by the cryomilling process. The rivets produced from the powder generally have an extremely high yield strength, between about 73 ksi and about 104 ksi, and ultimate tensile strength, between about 78 ksi and about 107 ksi. More importantly, the metal alloys may have the same or higher yield strength at low temperatures, ranging from about 67 ksi to about 126 ksi at −320° F., and ranging from about 78 ksi to about 106 ksi at −423° F. Similarly, the ultimate tensile strength of the alloys may range from about 78 ksi to about 129 ksi at −320° F. and from about 107 ksi to about 121 ksi at −423° F.

The invented rivets produced with the invented method have extremely fine grain size, averaging less than 0.5 μm, and are light weight and thermally stable within a wide temperature range, up to about 850° F.

Ultra-fine dispersoid particles formed within the metal during cryomilling provide stability against grain growth during elevated temperature processing of the rivets, such as powder consolidation, extrusion, and forging, and also contribute to the overall strength and resistance to strain localization.

Another advantage of the invented method over precipitation heat treated alloys is the avoidance of coherent precipitates. Coherent precipitates, typical of conventional high strength rivet aluminum alloys, tend to cause stress corrosion cracking. Lack of the coherent precipitates avoids problems with stress corrosion cracking. Further, rivets produced with the invented process do not require heat treatment as do conventional high-strength rivets.

BRIEF DESCRIPTION OF THE DRAWINGS

Having thus described the invention in general terms, reference will now be made to the accompanying drawing, which is not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As used herein, "alloy" describes the solid solution of aluminum and a "secondary metal" selected from magnesium, lithium, silicon, titanium, and zirconium which may or may not contain precipitated compounds of aluminum and the secondary metal. In addition, the alloy may contain metal components such as Be, Ca, Sr, Ba, Ra, Sc, V, Cr, Mn, Fe, Co, Ni, Cu, Zn, Y, Nb, Mo, Tc, Ru, Rh, Pd, Ag, Cd, W, or combinations thereof. For convenience, the metals which may be used in accordance with the invention other than aluminum and the secondary metals are referred to hereinafter as "tertiary metals". As with any alloys, the alloy may contain very low concentrations of a variety of contaminants or impurities, including naturally occurring oxide and nitride phases of the metals. The alloys used in formation of the rivets do not, however, contain extrinsically added amounts of refractory materials such as oxides, nitrides, borides, carbides, oxynitrides, or carbo-nitrides.

As used herein, "nanostructured material synthesis" or similar terminology generally refers to methods of metal production which result in a material having average grain sizes on the order of nanometers. For purposes of the disclosure, nanostructured materials may include those alloys having an average grain size of 0.5 μm or less. For purposes of this invention, nanostructured material synthesis will also include the addition of controlled amounts of nitrogen to the metal alloy.

Cryomilling in liquid nitrogen is one advantageous method to develop the fine grain size and also to incorporate nitrogen into the alloy. Therefore, cryomilling is used as the exemplary synthesis method throughout the majority of the disclosure. However, one skilled in the art could also produce similar alloys using other common methods for formation of nanostructured materials, carried out in a controlled nitrogen environment. These synthesis methods include, but are not limited to, gas condensation, chemical vapor condensation, plasma synthesis, rapid solidification of powder, and severe plastic deformation. Synthesis is advantageously carried out in a nitrogen environment in order to incorporate a limited, controlled amount of nitrogen into the metal or alloy.

As used herein, "cryomilling" describes the fine milling of metallic constituents at extremely low temperatures, such as temperatures less than about −320° F. Cryomilling takes place within a high energy mill such as an attritor with metallic or ceramic balls. During milling, the mill temperature is lowered by using liquid nitrogen. In an attritor, energy is supplied in the form of motion to the balls within the attritor, which impinge portions of the metal alloy powder within the attritor, causing repeated comminuting and welding of the metal.

The high-strength metal alloy powders, extrusions, and formed rivets of this invention begin as a pre-alloyed metal or as a combination of metals in the form of small particulates or powder. The base metal of the alloy is aluminum, which makes up about 89 atomic % to about 99 atomic % aluminum. The secondary metal is about 1 atomic % to about 11 atomic % of a secondary metal selected from magnesium, lithium, silicon, titanium, and zirconium, or combinations thereof. Optionally, the alloy contains a tertiary metal of up to 10 atomic % selected from Be, Ca, Sr, Ba, Ra, Sc, V, Cr, Mn, Fe, Co, Ni, Cu, Zn, Y, Nb, Mo, Tc, Ru, Rh, Pd, Ag, Cd, W, or combinations thereof.

By way of comparison, 11 atomic % of the secondary metal in aluminum is equivalent to about 10 weight % magnesium, 3 weight % lithium, 11 weight % silicon, 18 weight % titanium, or 30 weight % zirconium.

When intimately combined, mixed, and milled, the aluminum, secondary, and optionally tertiary metals form a solid solution containing small amounts of precipitated aluminum-secondary metal. When magnesium is used as the secondary metal, the equilibrium aluminum-magnesium precipitate formed is $Al_3Mg_2$, though other non-equilibrium phases of the precipitate may also be present. Any other metals, optionally added to the aluminum and magnesium mixture, form a solid solution with the aluminum and magnesium.

If the beginning metal powder is supplied as pre-alloyed powder, then it can proceed directly to the cryomilling process. Metal powders that have not been previously alloyed can also proceed to the cryomilling step, since the cryomilling will intimately mix the aluminum constituent with the secondary constituent and thereby alloy the metals.

Prior to milling, it is preferred to handle the starting metal powders in a substantially oxygen free atmosphere. For instance, the aluminum is preferably supplied by atomizing the aluminum from an aluminum source and collecting and storing the atomized aluminum in a container under an argon or other inert atmosphere. The aluminum is held in the argon atmosphere, or in a dry nitrogen atmosphere, throughout all handling, including the operation of mixing the aluminum powder with the secondary metal prior to milling. Holding the raw aluminum within an argon or nitrogen atmosphere prevents the surface of the aluminum particles from excessive oxidation. The inert atmosphere also prevents contaminants such as moisture from reacting with the raw metal powder.

Since magnesium and other metals readily oxidize, they are treated in the same manner as aluminum prior to milling. Thus, the aluminum and other metal powders are supplied uncoated, meaning without a coating of metal oxides.

The use of source metal powder having oxide coatings does not completely destroy the strength and low temperature benefits gained through the invented process, but alloys produced with a minimum of oxide content are preferred, and alloys having almost no oxide content may be produced in accordance with this invention. Further, extrinsic refractory materials such as oxides, carbides, nitrides, borides, oxy-nitrides, carbo-nitrides, and the like are not added to the alloy. Though extrinsic refractory dispersoids usually strengthen metal alloys through dispersion strengthening, oxides occurring naturally upon the surface of the metal starting materials are not preferred in the alloy, and extrinsic refractory dispersoids cause notable deterioration in the physical properties of the alloy.

Figure 1:
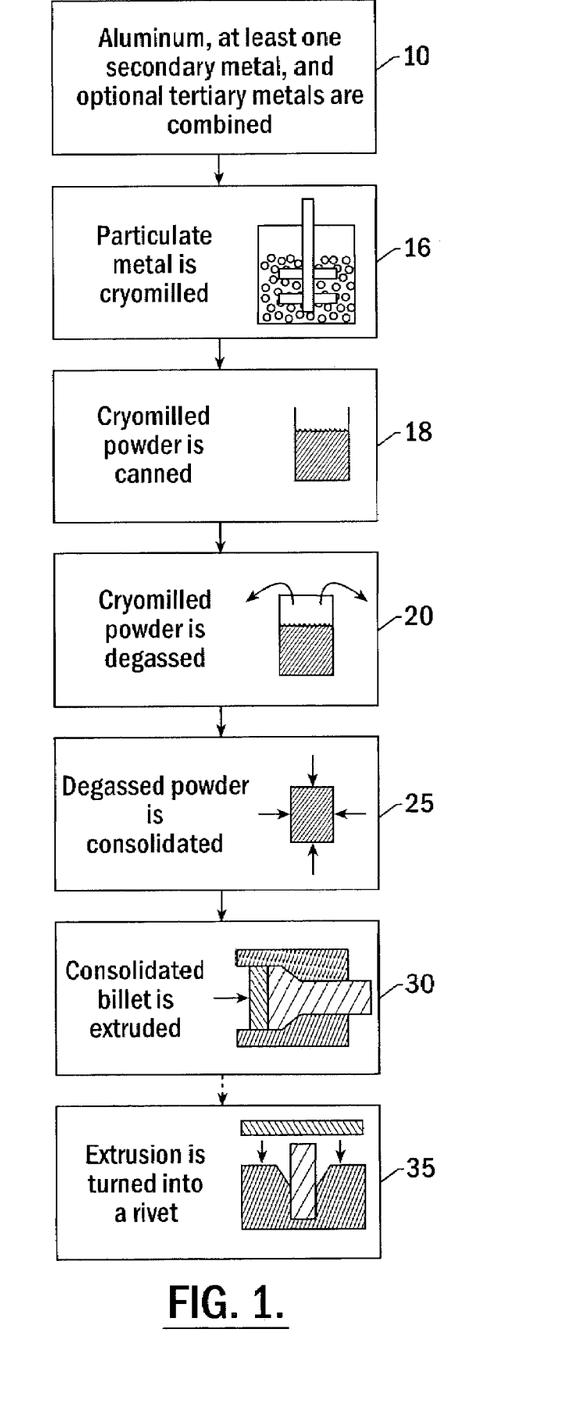
FIG. 1 is a schematic flow diagram of a process embodiment of this invention.

Referring now to FIG. 1, once the constituents of the aluminum alloy are selected 10, the combined or pre-alloyed metal powder is cryomilled 15. As noted above, cryomilling is the repeated comminuting and welding of the metal particles in a very low temperature environment.

Figure 2:
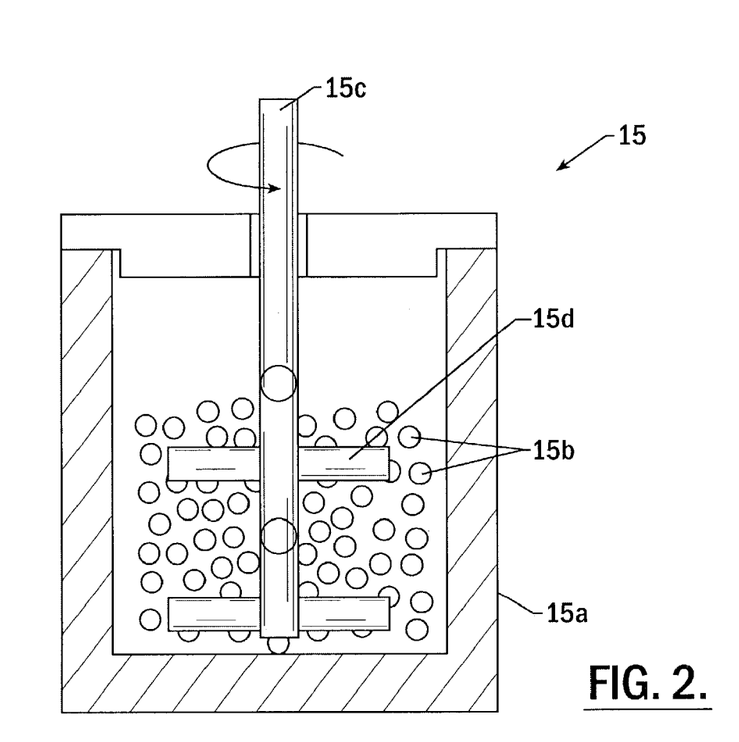
FIG. 2 is a side sectional view of an exemplary ball mill and attritor for use in an embodiment of this invention.

It is preferred that the cryomilling 15 of the very small particles of metal powder take place within a ball attritor. As shown in FIG. 2, the ball attritor is typically a cylindrical vessel 15a filled with a large number of ceramic or metallic spherical balls 15b, preferably stainless steel balls. A single fixed-axis shaft 15c is disposed within the attritor vessel, and there are several radial arms 15d extending from the shaft. As the shaft 15c is turned, the arms 15d cause the spherical balls 15b to move about the attritor. When the attritor contains metal powder and the attritor is activated, portions of the metal powder are impinged between the metal balls 15b as they move about the attritor. The force of the metal balls 15b repeatedly impinges the metal particles and causes the metal particles to be continually comminuted and welded together. This milling of the metal powder effectively cold-works the metal.

Cold working imparts a high degree of plastic strain within the powder particles. During cold working, the repeated deformation causes a buildup of dislocation substructure within the particles. After repeated deformation, the dislocations evolve into cellular networks that become high-angle grain boundaries separating the very small grains of the metal. Grain diameters as small as approximately $2.5 \times 10^{-8}$ meter have been observed via electron microscopy and measured by x-ray diffraction at this stage in processing. Structures having dimensions smaller than $10^{-7}$ meter, such as those found in the metallic produced at this stage in the invented process, are commonly referred to as nanostructured.

Stearic acid may be added as one of the components to be milled with the metal powder. It promotes the fracturing and re-welding of metal particles during milling, leading to more rapid milling, and leading to a larger fraction of milled powder produced during a given process cycle.

During milling 16, the metal powder is reduced to and held at a temperature of approximately −320° F. by exposure of the metal powder to liquid nitrogen. The liquid nitrogen is a convenient way to lower the temperature of the entire cryomilling system. Also, surrounding the metal powder in liquid nitrogen limits exposure of the metal powder to oxygen or moisture. In operation, the liquid nitrogen is placed inside the attritor, in contact with the metal particles and the attritor balls.

The operating parameters of the cryomilling 16 will depend upon the size of the attritor. For example, a 150 liter (40 gal) attritor is preferably operated at a speed of about 100 rpm. The amount of powder added to the attritor is dependent upon the size and number of balls within the attritor vessel. For a 150 liter attritor filled with 640 kg of 0.25" diameter steel balls, up to approximately 20 kg of metal power may be milled at any one time.

Milling 16 is continued for a time sufficient to reach an equilibrium nanostructure grain size within the metal. A milled metal powder having well dispersed metal constituents and metallic precipitate was found to be one that had been cryomilled to an extent to provide a minimum nitrogen content of 0.3%.

After milling 16, the metal alloy powder is a homogenous solid solution of aluminum and the secondary metal, optionally having other added tertiary metal components and optionally having minor amounts of metallic precipitate interspersed within the alloy. Grain structure within the alloy is very stable and grain size is less than 0.5 µm. Depending on the alloy and extent of milling the average grain size is less than 0.3 µm, and may be lower than 0.1 µm.

Not wishing to be bound by theory, a proposed mechanism for the development of the stable fine grain size in this material is that the nitrogen that is incorporated into the alloy during processing interacts with aluminum and the secondary metal to provide the stability against grain growth. Discrete particles such as nitrides are unobserved at magnifications up to 100,000× (sufficient to resolve particles as small as $10^{-8}$ m). Nevertheless, the free energy of formation of aluminum nitride or of magnesium nitride may be characteristic of the effect of nitrogen in the alloy. Both aluminum nitride and magnesium nitride have large negative free energies of formation, −287.0 kJ/mole for AlN, and −400.5 kJ/mole for $Mg_3N_2$. Nitrides of the other secondary metals (lithium, silicon, titanium and zirconium) also have large negative free energies of formation. Also, magnesium and the other the secondary metals each have a degree of solid solubility in aluminum.

After the metal alloy powder, with the proper composition and grain structure, is produced, it is transformed into a form that may be shaped into a useful object. The metal powder is canned 18, degassed 20, and then compacted and welded 25. After the combined step of compacting and welding 25, also referred to as consolidating 25, the metal is a solid mass which may be worked and shaped. The consolidated metal is extruded 30 into a usable metal component, and formed into the invented rivet 35.

At all times from cryomilling 15 through the completion of consolidation 25, the alloy powder is handled in an inert environment, preferably either a dry nitrogen atmosphere or a vacuum. The inert atmosphere prevents oxidation of the surface of the alloy powder particles. The inert atmosphere further prevents the introduction of moisture to the alloy and prevents other contaminants, which might be problematic in the extruded solid, from entering the powder.

Canning 18 of the alloy powder involves placing the powder within a sealed airtight container. The container, or can, is equipped with an evacuation port to be used in subsequent degassing 20. The alloy powder is degassed 20 while held in the can. A vacuum pump is operatively attached to the evacuation port of the can and used to provide a vacuum of approximately $10^{-6}$ torr or lower. The temperature of the metal alloy is raised, concurrently with the vacuum treatment, to a temperature of between about 600° F. and about 850° F., and preferably about 775° F. to about 850° F. The elevated temperature and decreased pressure cause the evacuation of gaseous components from the metal alloy powder.

The degassing 20 removes components of any stearic acid included with the powder metal blend when cryomilled within the attritor. Hydrogen, which evolves from the stearic acid, is the main degassed component. Nitrogen found within the interstices of the powder, as well as nitrogen used to evacuate the can prior to packing with the metal particles, is also degassed. Small amounts of oxygen or moisture present within the powder may also be removed from the powder during the degassing. Degassing 20 is theoretically continued until no free gas species remain in the alloy powder, but is practically continued until the content of hydrogen is below a predetermined threshold, such as 5 weight parts per million (wppm).

The fine grain size of the metal has the unique and useful property of being stable on annealing to temperatures of about 850° F. This enables the powder to endure the relatively high temperatures experienced during degassing 20 and consolidation 25 while maintaining the fine grain size that contributes to strength.

After degassing 20, the can containing the alloy powder is sealed and is transferred to a hot isostatic press (HIP). The temperature of the powder is either maintained at between about 600° F. to about 850° F. after degassing 20 or, if the temperature of the alloy has been allowed to drop, reheated to between about 600° F. to about 850° F. While maintaining the elevated temperature, the press is pressurized with an inert gas, preferably argon, and the can is compressed within the press at a static pressure that is generally between about 15 ksi and about 30 ksi. The temperature and pressure exerted upon the metal alloy powder cause the metal particles to be consolidated into a singular solid billet. The pressure and temperature are maintained until the mass of consolidated metal is nearly 100% free of porosity. Though pressing times will vary with the exact alloy being consolidated, a typical hot isostatic pressing time will be approximately 4 hours.

After consolidation 25, the solid metal alloy is extruded 30. Extrusion 30 may be used to form the solid into a blank for later forging or may be used to form the solid metal directly into a usable part. The extrusion process typically alters the physical properties of the alloy somewhat. For instance, extrusion decreases the hardness and increases the grain size of the consolidated billet. Also, tensile ductility is notably improved after extrusion.

Figure 3:
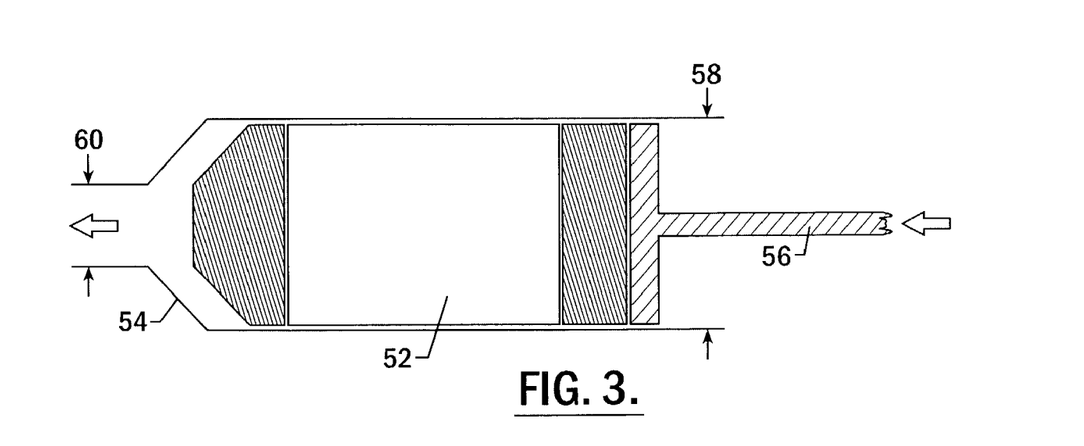
FIG. 3 is a side sectional view of an exemplary extrusion apparatus in accordance with an embodiment of the invention.

Referring to FIG. 3, the consolidated alloy is typically shaped in the form of a cylindrical billet 52 having a first diameter 58. The aluminum alloy billet 52 is forced through a conical die 54 by a ram 56. When the consolidated alloy 52 is extruded, the diameter of the billet is reduced to a second diameter 60 and the length of the billet 52 is extended. For extrusion 30, the alloy is generally heated to a temperature between about 350° F. and 450° F., and preferably about 400° F. Extrusion 30 of the alloy preferably occurs at greater than a 6 to 1 extrusion area ratio, but other extrusion ratios may be utilized. The speed of the ram 56 which forces the billet through the die 54 is typically about 0.02 inches per second. For a 3 inch diameter extrusion at an extrusion ratio of 7:1, this provides an average strain rate of 0.025 $sec^{-1}$.

The extrusions of the metal alloy are forged or otherwise formed 35 into the shape of a rivet. Prior to forming 35, the extruded blank is typically heated to a temperature of approximately 600° F. Strain rate during the upset forging should commonly be less than 0.02 per second. After forming 35, the alloy component is rapidly cooled to room temperature or below in order to limit the growth of an Al—Mg intermetallic phase. Overall forming generally imparts a total strain to the alloy of from about 0.4 to about 0.8.

Figure 4:
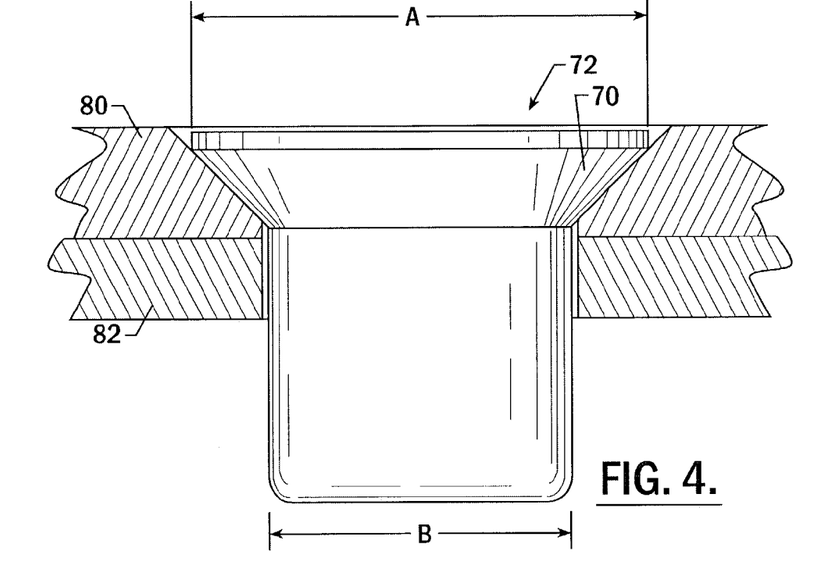
FIG. 4 is a side view of an exemplary solid rivet of the invention.

Referring to FIG. 4, a rivet may be formed as a solid rivet. An exemplary solid rivet is shown having a head portion 70 and a body portion 72. The head portion has a maximum diameter A. The body portion 72 of the rivet is typically cylindrical and is axially aligned with the head portion 70. The body portion 72 has an outside diameter B which is less than the maximum diameter of the head portion. The rivet is shown placed in a hole defined through two adjoining sheets of metal, an outer sheet 80 and inner sheet 82, with the face of head 70 facing upward and the body 72 protruding downward through the sheets. As with conventional solid rivets, to upset the rivet, a downward force is applied to the head 70 of the rivet to hole the rivet in place, while an upward force is simultaneously applied to the protruding portion of the body 72. The combined force causes deformation of the body 72 which serves to bind the two sheets 80,82 together.

Figure 5:
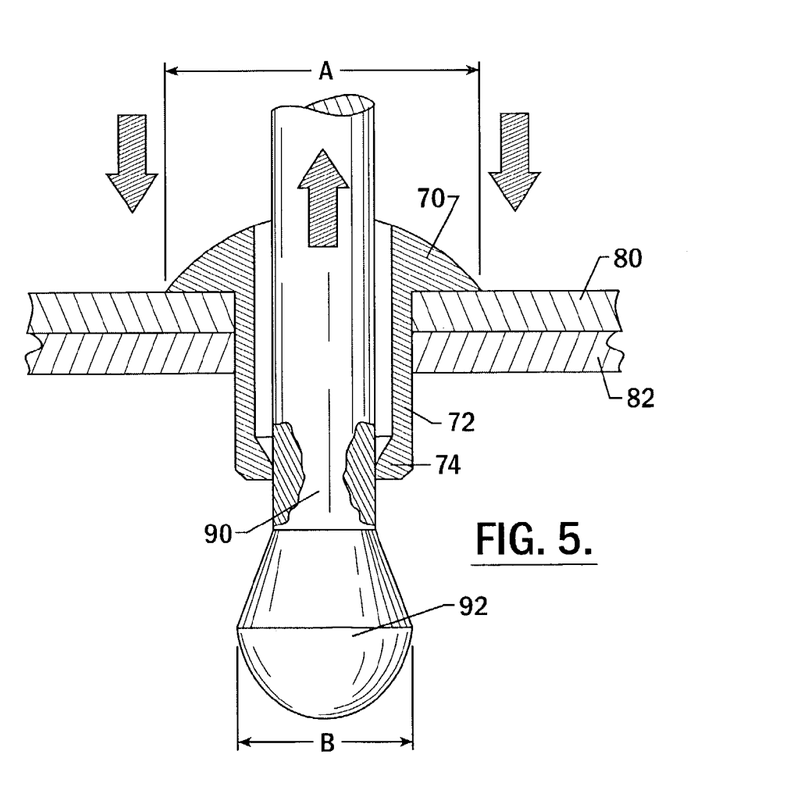
FIG. 5 is a side view of an exemplary blind rivet of the invention.

Referring to FIG. 5, a rivet may be formed as a blind rivet. An exemplary blind rivet is shown having a head portion 70 and a body portion 72. The head portion has a maximum diameter A. The body portion 72 of the rivet is typically cylindrical and is axially aligned with the head portion 70. The body portion 72 has an outside diameter B which is less than the maximum diameter of the head portion. The body portion of the rivet is bored and contains a stem 90 having a bulb 92. The body portion of the rivet has an inwardly extending lip 74. The rivet is shown placed in a hole defined through two adjoining sheets of metal, an outer sheet 80 and inner sheet 82, with the face of head 70 facing upward and the body 72 protruding downward through the sheets. The bulb 92 of the stem 90 has an outside diameter which is slightly larger than the inside diameter of the lip 74 such that the stem is kept from moving upwardly through the body by the contact of the lip 74 with the bulb 92. As with conventional blind rivets, to upset the rivet, a downward force applied to the head 70 of the rivet to keep it in place while the stem 90 is pulled upwardly. As the stem 90 moves upwardly, it contacts the lip 74 of the body 72 with force thereby deforming the body 72 which serves to fasten the rivet in place.

The physical properties of the alloy are present within the alloy powder produced in accordance with the invention, and are exhibited by the rivets formed through consolidation and extrusion of the metal, and optionally by further forging of the metal. Though not wishing to be bound by theory, the extraordinary strength and the ability of the rivets to maintain high strength and thermal stability over such a wide range of temperature, about −320° F. to about 850° F., depending on the alloy used, is believed to be due to the unique grain structure, grain size, and interaction of constituents of the alloy caused by the cryomilling process.

The high strength of the rivet produced in accordance with the invention is a result of extremely small nitride and oxynitride dispersoid particles plus the thermally stable ultra-fine grain size of the metal (less than 500 nanometers). The dispersoid particles prevent grain growth within the metal. Also, the microstructure of the metal deforms plastically in a more homogenous manner than the strain localization typical of conventional precipitation hardened high strength aluminum alloys.

Samples of the cryomilled and consolidated alloy having a content of 7.5 wt % magnesium and the balance aluminum have been examined a number of times via transmission electron microscopy (TEM) at magnifications up to 100,000×, which is sufficient to resolve particles as small as $10^{-8}$ m. Nitride particles or other second-base particles were not observable at this level of resolution. The observed structure is notably different from that of alloys having nitride or oxide additions that are readably observable via TEM.

The metal rivets produced from the powder have an extremely high yield strength, such as between about 73 ksi and about 104 ksi, and ultimate tensile strength, such as between about 78 ksi and about 107 ksi. The metal alloys have the same or higher yield strength at low temperatures, typically ranging from about 67 ksi to about 126 ksi at −320° F., and typically ranging from about 78 ksi to about 106 ksi at −423° F. Similarly, the ultimate tensile strength of the rivets generally ranges from about 78 ksi to about 129 ksi at −320° F. and from about 107 ksi to about 121 ksi at −423° F.

Metallic constituents in addition to aluminum and secondary metals may be combined into the metal alloy in accordance with the invented milling processes. For instance, any or a combination of the tertiary metals listed above may be combined with the aluminum and secondary metal. In particular, preferred alloys of molybdenum, vanadium, tungsten, iron, nickel, cobalt, manganese, copper, niobium, and chromium can be used in accordance with the processes of this invention to produce alloys having greater low temperature strength than corresponding dispersion strengthened aluminum alloys and other aluminum alloys formed by methods other than by the invented method.

An exemplary embodiment of a rivet constructed of an alloy which exhibits superior strength characteristics is the alloy containing 1-4.6 wt % magnesium, 6-9 wt % zinc, 2 wt % copper, 2 wt % cobalt, 0.2 wt % zirconium, and 0.2 wt % nickel by weight, with the remainder being aluminum. Cryomilling, consolidating, and extruding the alloy produces a rivet having room temperature and cryogenic temperature strength superior to conventional rivets.

The rivets formed from the aluminum alloys produced in accordance with this invention exhibit thermal stability at elevated temperatures and maintain high strength at reduced temperatures such as those experienced in the use of aerospace vehicles. The improved strength of the rivets is largely due to the fine grain size, average 0.5 μm or less, of the alloy from which they are constructed plus the extremely fine nitride and oxy-nitride dispersoids. The rivets are thermally stable to temperatures of about 850° F., depending upon the particular makeup of the alloy, so the rivet is resistant to stress cracking due to the fine grain size and lack of coherent precipitates. Thus, rivets produced in accordance with the invention are particularly suited for long term use in a wide variety of demanding physical and environmental situations.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of producing an aluminum alloy rivet comprising:
    providing a metal powder comprising
        0.9 to 10 weight % magnesium;
        6 weight % to 9 weight % zinc;
        about 2 weight % copper;
        about 2 weight % cobalt;
        about 0.2 weight % zirconium;
        about 0.2 weight % nickel; and
        balance aluminum;

processing the metal powder with a nanostructured material synthesis technique such that
at least 0.3 weight % nitrogen is added to the metal powder without introducing
substantially any refractory material during processing and wherein
the processed metal powder has a yield strength from about 67 to 126 ksi at −320° F.;
consolidating the processed metal powder; and
forming the consolidated metal into the form of a rivet having at least a head portion and a body portion.

2. The method of claim 1, further comprising pre-alloying the provided metal powder prior to processing.

3. The method of claim 1, wherein the synthesis technique is selected from the group consisting of cryomilling, gas condensation, chemical vapor deposition, plasma synthesis, rapid solidification, and severe plastic deformation, whereby a limited and controlled amount of nitrogen may be introduced into the alloy.

4. The method of claim 3, wherein the synthesis technique is cryomilling.

5. The method of claim 4, wherein the step of cryomilling comprises:

supplying the metal powder to a ball mill attritor;
maintaining the supply of metal powder in a liquid nitrogen medium;
activating the attritor, whereby the metal powder is repeatedly impinged between metal balls within the attritor;
deactivating the attritor; and,
removing the cryomilled metal powder from the attritor.

6. The method of claim 5, wherein the step of cryomilling is continued until the equilibrium grain size of the metal is reached.

7. The method of claim 6, wherein the step of cryomilling is continued for between 6 and 10 hours.

8. The method of claim 7, wherein the step of cryomilling is continued for about 8 hours.

9. The method of claim 1, wherein the step of providing a metallic powder comprises providing a metallic powder substantially free of oxides.

10. The method of claim 9, wherein the metal powder is provided in a substantially oxygen-free atmosphere.

11. The method of claim 1, wherein the magnesium is present in an amount of 4 weight % to 10 weight % of the alloy.

* * * * *